United States Patent
Kawazu et al.

(10) Patent No.: US 6,655,424 B2
(45) Date of Patent: Dec. 2, 2003

(54) FUEL GAS FILLER STRUCTURE FOR GAS-FUELED VEHICLE

(75) Inventors: Masahiro Kawazu, Shioya-gun (JP); Yoshihiro Shimizu, Utsunomiya (JP); Tohru Ono, Kawachi-gun (JP); Seiji Ohgami, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/406,405

(22) Filed: Apr. 3, 2003

(65) Prior Publication Data
US 2003/0188798 A1 Oct. 9, 2003

(30) Foreign Application Priority Data
Apr. 8, 2002 (JP) .......................................... 2002-105625

(51) Int. Cl.[7] .................................................. B65B 1/04
(52) U.S. Cl. ............................. 141/98; 141/94; 141/83; 361/215
(58) Field of Search ...................... 141/98, 94, 192, 141/197, 83; 361/215, 216; 220/86.1, 86.2

(56) References Cited

U.S. PATENT DOCUMENTS

| | | | | |
|---|---|---|---|---|
| 1,524,423 A | * | 1/1925 | Chapman | 361/215 |
| 1,564,855 A | * | 12/1925 | Jurs | 361/215 |
| 1,564,925 A | * | 12/1925 | Anthony | 361/215 |
| 1,749,179 A | * | 3/1930 | Davis, Jr. | 361/215 |
| 2,767,659 A | * | 10/1956 | Greenblatt | 141/98 |
| 2,911,607 A | * | 11/1959 | Booth | 361/215 |
| 4,319,303 A | * | 3/1982 | Thorn | 361/215 |
| 5,159,523 A | * | 10/1992 | Claassen et al. | 361/215 |
| 6,127,934 A | * | 10/2000 | Powell, Jr. et al. | 361/215 |
| 6,401,767 B1 | * | 6/2002 | Cohen et al. | 141/98 |

* cited by examiner

*Primary Examiner*—Gregory Huson
*Assistant Examiner*—Khoa Huynh
(74) *Attorney, Agent, or Firm*—Merchant & Gould P.C.

(57) ABSTRACT

An inexpensive fuel gas filler structure for a gas-fueled vehicle enables the connection between a ground line and a ground connection portion of the vehicle before the insertion of a fuel gas filler nozzle into a fuel gas filler receptacle. The fuel gas filler structure for a gas-fueled vehicle comprises a fuel gas filler receptacle to which a fuel gas filler nozzle of an external fuel gas filling station is to be connected, a fuel filler lid which is opened or closed, by a fuel filler lid opener, for selectively covering the fuel gas filler receptacle, a ground connection portion to which a ground line of the fuel gas filling station is to be connected, and a ground connection lid which is opened or closed for selectively covering the ground connection portion, wherein an operating section of the fuel filler lid opener is disposed in a region which is covered by the ground connection lid in a closed state.

1 Claim, 5 Drawing Sheets

FUEL GAS FILLER STRUCTURE FOR GAS-FUELED VEHICLE

BACKGROUND OF THE INVENTION

1. Field of the Invention

The present invention relates to a fuel gas filler structure for a gas-fueled vehicle which is supplied with fuel gas via connection to an external fuel gas supply station.

2. Description of the Related Art

In recent years, fuel cell vehicles having fuel cells therein have been developed for practical use. As an example of such fuel cell vehicles, a type of vehicle is known which has a fuel cell supplied with a fuel gas and an oxidizing gas, and in which driving power is generated by electro-chemical reactions of the gases (reaction gases) in the fuel cell. Because air can be used as the oxidizing gas, the oxidizing gas does not need to be stored in the vehicle; however, the fuel gas such as hydrogen must be stored in the vehicle. As an example of supplying a fuel gas into a vehicle, a method may be conceived which comprises a step of inserting a fuel gas filler nozzle, which is connected to an external fuel gas filling station, into a fuel gas filler receptacle provided in the vehicle, as in the case for a conventional gasoline vehicle.

Before inserting the fuel gas filler nozzle into the fuel gas filler receptacle for supplying a fuel gas into the vehicle, static electrical charge must be dissipated. As a countermeasure for static electrical charge, a fuel filler lid made of conductive material may be employed.

Another proposal has been made in which a ground connection portion is provided in the vehicle in addition to the fuel gas filler receptacle, and the ground connection portion is connected to a ground line of a fuel gas filling station for dissipating static electrical charge. In this case, the ground line of the fuel gas filling station must be connected to the ground connection portion provided in the vehicle before inserting the fuel gas filler nozzle into the fuel gas filler receptacle, and a system may be conceived in which the connection between the ground line and the ground connection portion of the vehicle is, for example, electrically detected by a sensor, and the insertion of the fuel gas filler nozzle into the fuel gas filler receptacle is permitted based on the detected result; however, such a system implies a great increase in cost.

SUMMARY OF THE INVENTION

In consideration of the above circumstances, an object of the present invention is to provide an inexpensive fuel gas filler structure for a gas-fueled vehicle which enables accomplishing the connection between the ground line and the ground connection portion of the vehicle before the insertion of the fuel gas filler nozzle into the fuel gas filler receptacle.

In order to achieve the above object, the present invention provides a fuel gas filler structure for a gas-fueled vehicle comprising: a fuel gas filler receptacle to which a fuel gas filler nozzle of an external fuel gas filling station is to be connected; a fuel filler lid which is opened or closed, by a fuel filler lid opener, for selectively covering the fuel gas filler receptacle; a ground connection portion to which a ground line of the fuel gas filling station is to be connected; and a ground connection lid which is opened or closed for selectively covering the ground connection portion, wherein an operating section of the fuel filler lid opener is disposed in a region which is covered by the ground connection lid in a closed state.

According to the present invention, when the ground connection lid is closed, and when the ground line of the fuel gas filling station is not connected to the ground connection portion, the fuel filler lid cannot be opened because the operating section of the fuel filler lid opener is covered by the ground connection lid so as not to be exposed. As a result, the connection of the fuel gas filler nozzle of an external fuel gas filling station to the fuel gas filler receptacle is prohibited by the fuel filler lid in a closed state. On the other hand, when the ground connection lid is opened in order to connect the ground line of the fuel gas filling station to the ground connection portion, the operating section of the fuel filler lid opener is exposed so as to be accessible, and the fuel filler lid can be opened. Accordingly, the insertion of the fuel gas filler nozzle into the fuel gas filler receptacle can be accomplished only after the ground line is connected to the ground connection portion by merely disposing the operating section of the fuel filler lid opener for opening the fuel filler lid in a region which is covered by the ground connection lid in a closed state.

BRIEF DESCRIPTION OF THE DRAWINGS

FIG. 1A is a front view showing a fuel cell vehicle to which the fuel gas filler structure is applied and a fuel gas filler station, and FIG. 1B is a front view showing the fuel gas filler structure.

FIG. 4A is a front view showing the fuel cell vehicle to which the fuel gas filler structure is applied and the fuel gas filler station, and FIG. 4B is a front view showing the fuel gas filler structure while excluding the fuel gas filler station.

DESCRIPTION OF THE PREFERRED EMBODIMENTS

A fuel gas filler structure for a gas-fueled vehicle according to an embodiment of the present invention will be explained below with reference to the appended drawings.

Figure 1A:
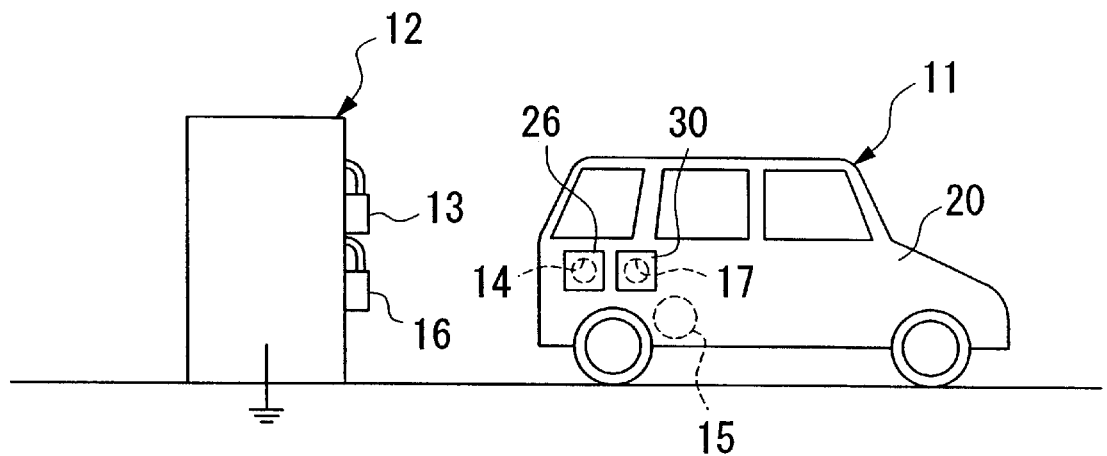
FIGS. 1A and 1B are explanatory diagrams showing a fuel gas filler structure for a gas-fueled vehicle according to an embodiment of the present invention in a state just before starting a filling operation of the fuel gas, and more specifically.

The fuel gas filler structure of the present embodiment is applied to a fuel cell vehicle as a gas-fueled vehicle. As shown in FIG. 1A, the fuel cell vehicle 11 comprises a fuel gas filler receptacle 14 to which a fuel gas filler nozzle 13 of an external fuel gas filling station 12, which is provided separately from the fuel cell vehicle 11, is to be connected, and to which a fuel gas (e.g., hydrogen) is supplied from the fuel gas filling station 12 via the connected fuel gas filler nozzle 13, a fuel gas tank 15 which stores the fuel gas (e.g., hydrogen) from the fuel gas filling station 12 via the fuel gas filler receptacle 14, and a ground connection portion 17 to which a ground line 16 of the fuel gas filling station 12 is connected, and which is provided for dissipating static electrical charge via the connected ground line 16. The ground line 16 is grounded at the fuel gas filling station 12.

Figure 2:
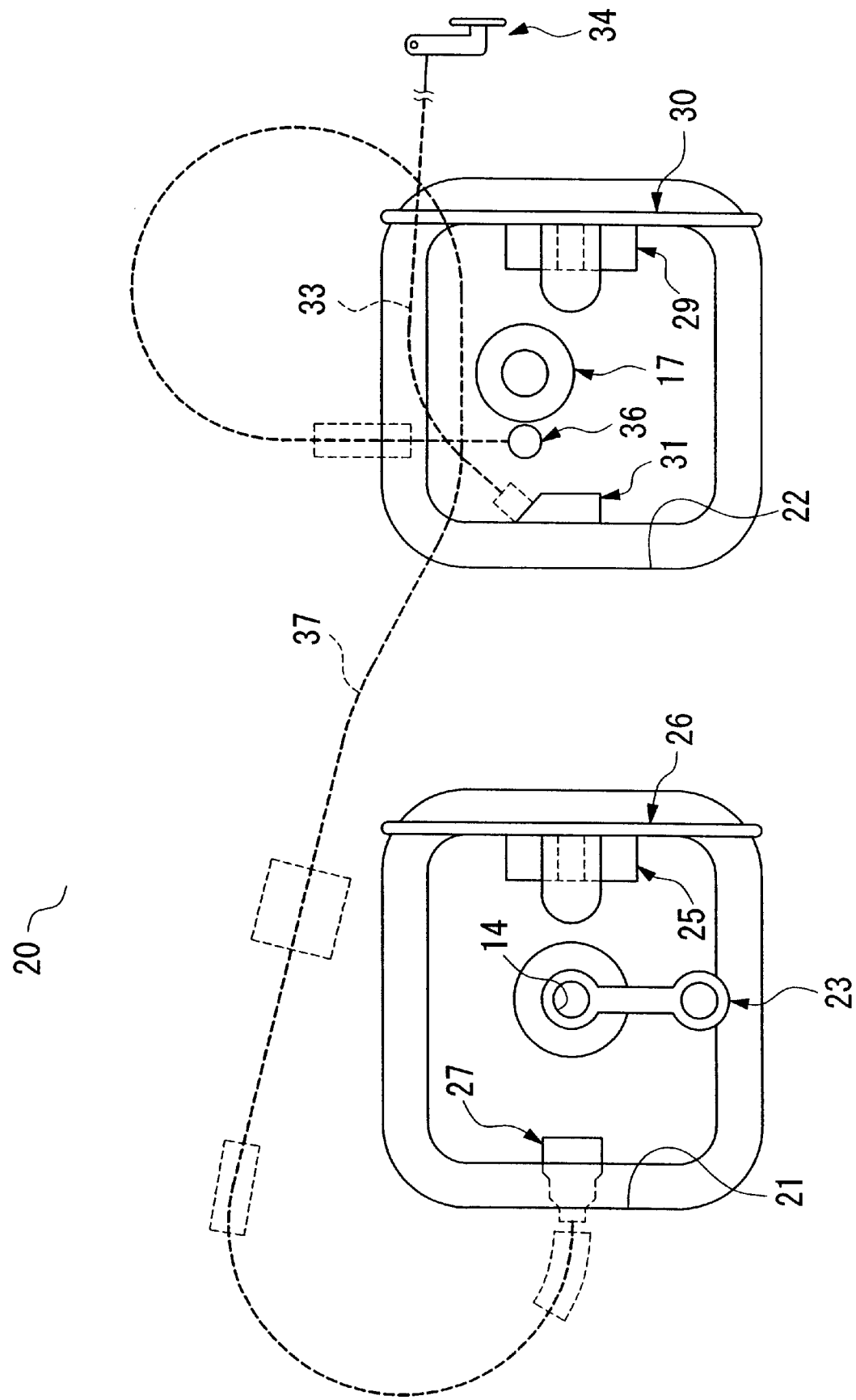
FIG. 2 is a front view showing the fuel gas filler structure for a gas-fueled vehicle according to an embodiment of the present invention in a second stage of the filling operation of the fuel gas while excluding the fuel gas filler station.
Figure 3:
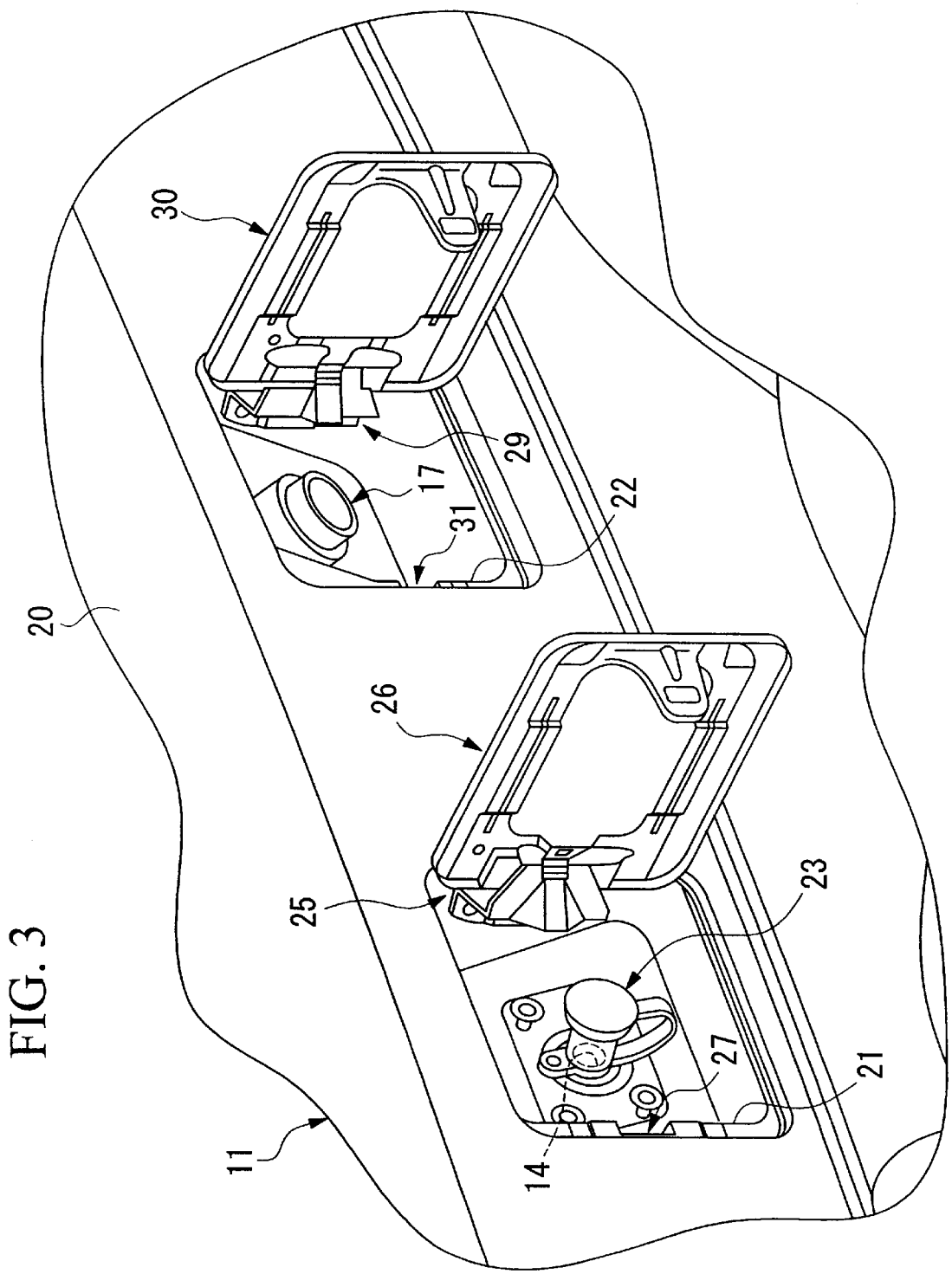
FIG. 3 is a perspective view showing the fuel gas filler structure for a gas-fueled vehicle according to an embodiment of the present invention in the second stage of the filling operation of the fuel gas while excluding the fuel gas filler station.

In the rear side portion of a body 20 of the fuel cell vehicle 11, there are provided a fuel filler concave portion 21 which is concave from the outer surface of the body 20, and a ground connection concave portion 22 which is concave from the outer surface of the body 20, and which is disposed adjacent to the fuel filler concave portion 21 while separated from the same in the longitudinal direction of the body 20 as shown in FIGS. 2 and 3. The fuel gas filler receptacle 14 is provided in the back of the fuel filler concave portion 21, and ground connection portion 17 is provided in the back of the ground connection concave portion 22. The fuel gas filler receptacle 14 is provided with a cap 23 which is in an opened state in which the fuel gas filler nozzle 13 is insertable into the fuel gas filler receptacle 14 by being manually operated by an operator filling the fuel gas (e.g., a driver or an attendant), and is in a closed state in which the fuel gas filler receptacle 14 is closed and sealed.

The fuel filler concave portion 21 is provided with a fuel filler lid 26 which is swingable, by being connected to the body 20 using a hinge mechanism 25, between a closed state in which the fuel filler concave portion 21 is closed and an opened state in which the fuel filler concave portion 21 is opened, and a fuel filler lid locking mechanism 27 for locking the fuel filler lid 26 in the closed state with respect to the body 20. When the fuel filler lid 26 is in the closed state, the fuel gas filler receptacle 14 is not accessible from outside because the fuel gas filler receptacle 14 is covered by the fuel filler lid 26 along with the cap 23. On the other hand, when the fuel filler lid 26 is in the opened state, the fuel gas filler receptacle 14 is exposed and is accessible from outside.

The ground connection concave portion 22 is provided with a ground connection lid 30 which is swingable, by being connected to the body 20 using a hinge mechanism 29, between a closed state in which the ground connection concave portion 22 is closed and an opened state in which the ground connection concave portion 22 is opened, and a ground connection lid locking mechanism 31 for locking the ground connection lid 30 in the closed state with respect to the body 20. When the ground connection lid 30 is in the closed state, the ground connection portion 17 is not accessible from outside because the ground connection portion 17 is covered by the ground connection lid 30. On the other hand, when the ground connection lid 30 is in the opened state, the ground connection portion 17 is exposed and is accessible from outside.

As shown in FIG. 2, an unlocking wire 33 is connected to the ground connection lid locking mechanism 31. The unlocking wire 33 is connected to a ground connection lid opener 34 (an operating section of the ground connection lid) which is disposed in the compartment of the vehicle. When an operator manually operates the ground connection lid opener 34, e.g., pulls the ground connection lid opener 34, in a state in which the ground connection lid locking mechanism 31 locks the ground connection lid 30 in a closed state, the ground connection lid 30 is unlocked by the movement of the unlocking wire 33. On the other hand, when the ground connection lid 30 in the opened state is swung by a filling operator so as to close the ground connection lid 30, the ground connection lid 30 is automatically locked by the ground connection lid locking mechanism 31.

In this embodiment, a fuel filler lid opener 36 (an operating section of the fuel filler lid), which is operated by a filling operator in order to open the fuel filler lid 26, is disposed in the ground connection concave portion 22 along with the ground connection portion 17 so as to be adjacent to each other. An unlocking wire 37 is connected to the fuel filler lid opener 36, and the unlocking wire 37 is connected to the fuel filler lid locking mechanism 27 at the other end thereof. When an operator manually operates the fuel filler lid opener 36, e.g., pulls the fuel filler lid opener 36, in a state in which the fuel filler lid locking mechanism 27 locks the fuel filler lid 26 in a closed state, the fuel filler lid 26 is unlocked by the movement of the unlocking wire 37. On the other hand, when the fuel filler lid 26 in the opened state is swung by a filling operator so as to close the fuel filler lid 26, the fuel filler lid 26 is automatically locked by the fuel filler lid locking mechanism 27.

As explained above, the fuel filler lid opener 36, which is operated by a filling operator in order to open the fuel filler lid 26, is disposed in the ground connection concave portion 22 in such a manner that the fuel filler lid opener 36 is covered by the ground connection lid 30, i.e., the fuel filler lid opener 36 is not exposed, when the ground connection lid 30 is closed, and that the fuel filler lid opener 36 is exposed when the ground connection lid 30 is opened.

Next, a fuel gas filling process using the fuel gas filler structure of the present embodiment is described.

Figure 1B:
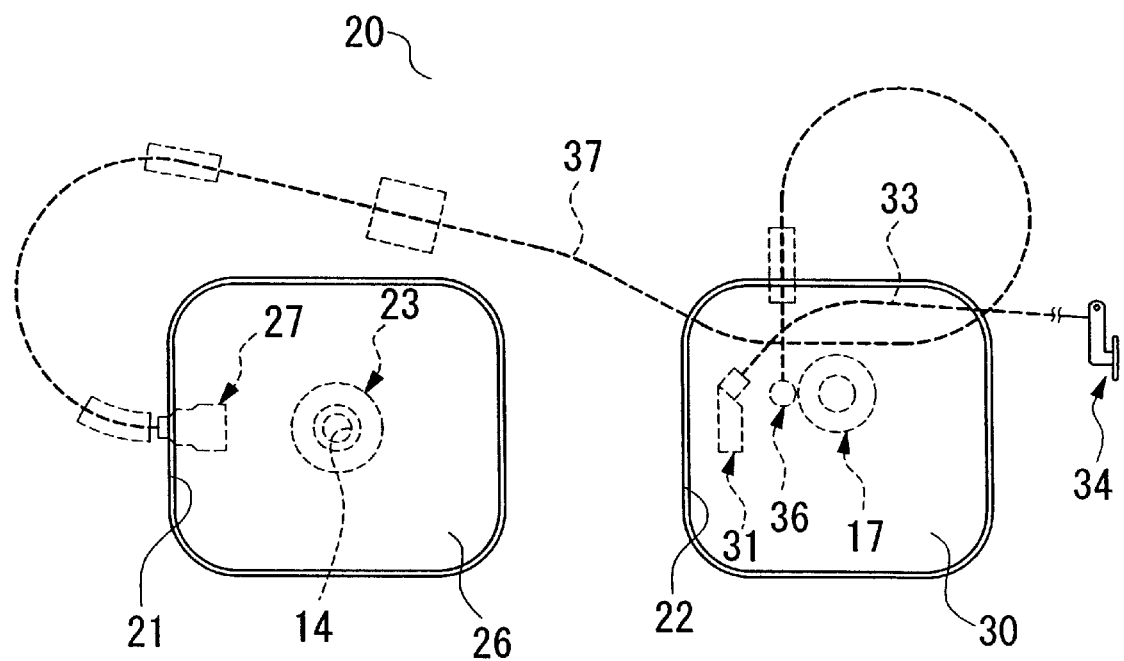
Figure 4A:
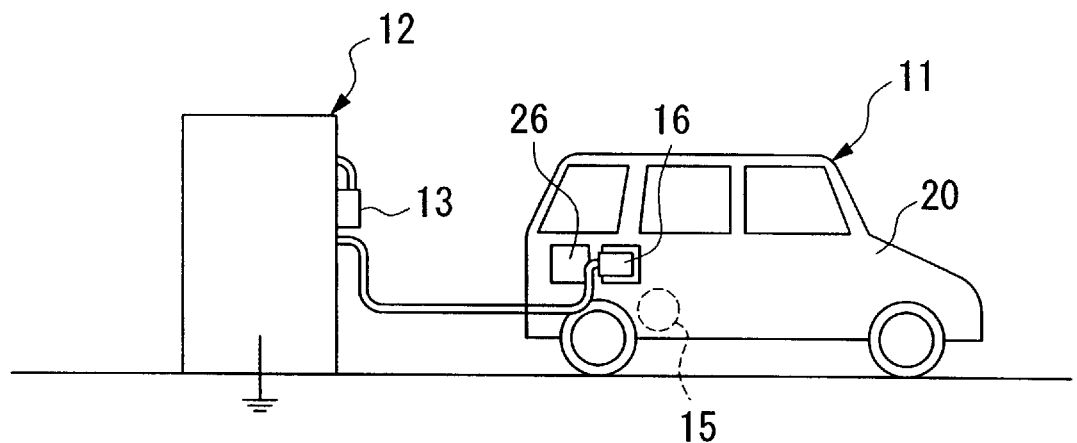
FIGS. 4A and 4B are explanatory diagrams showing the fuel gas filler structure for a gas-fueled vehicle according to an embodiment of the present invention in a first stage of the filling operation of the fuel gas, and more specifically.
Figure 4B:
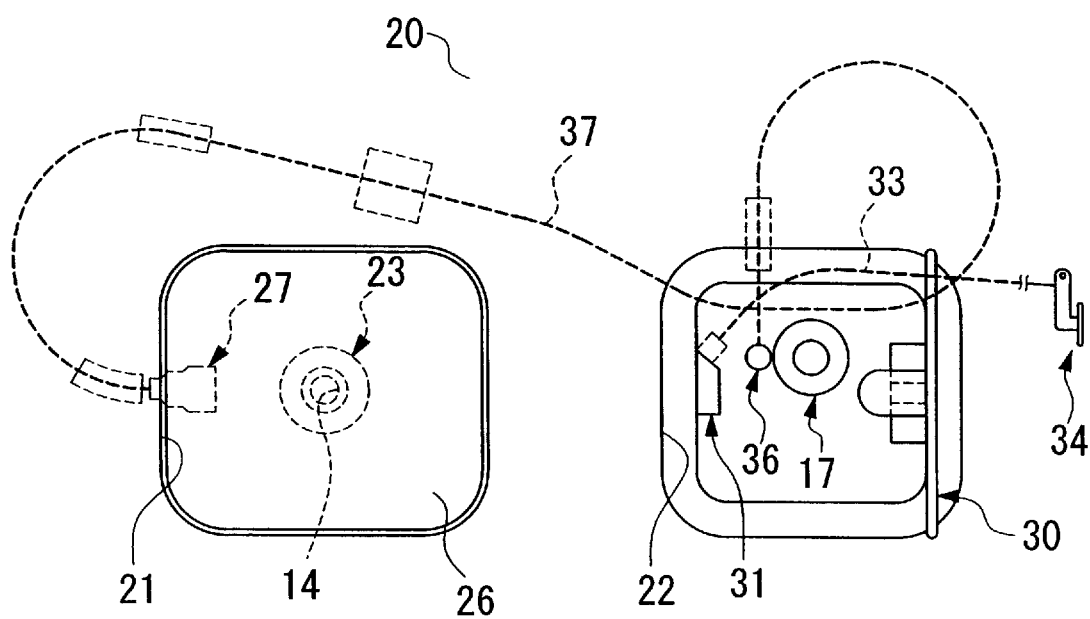

In order to supply the fuel gas to the fuel cell vehicle 11, when the ground connection lid opener 34 provided in the fuel cell vehicle 11 is manually operated so as to open by an operator, e.g., by a driver, in a state shown in FIG. 1, the ground connection lid 30 locked by the ground connection lid locking mechanism 31 is unlocked by the movement of the unlocking wire 33, and the ground connection lid 30 is opened as shown in FIG. 4. Next, a filling operator connects the ground line 16 of the fuel gas filling station 12 to the ground connection portion 17 which is exposed by opening the ground connection lid 30 (the connection to the fuel gas filling station 12 is not shown in FIG. 4B). At this time, the static electrical charge which has accumulated in the body 20 of the fuel cell vehicle 11 and in the filling operator is dissipated through the ground line 16, and as a result, potential differences among the body 20 of the fuel cell vehicle 11, the operator, and the fuel gas filling station 12 become zero. Because the fuel filler lid opener 36 provided in the ground connection concave portion 22 is not exposed as long as the ground connection lid 30 is closed, the fuel filler lid 26 cannot be opened, and the fuel gas filler receptacle 14 will not be exposed as long as the ground connection lid 30 is closed; therefore, an erroneous operation, in which the fuel filler lid 26 is open, and the fuel gas filler nozzle 13 of the external fuel gas filling station 12 is connected to the fuel gas filler receptacle 14 before connecting the ground line 16 to the ground connection portion 17, can be prevented.

Figure 5:
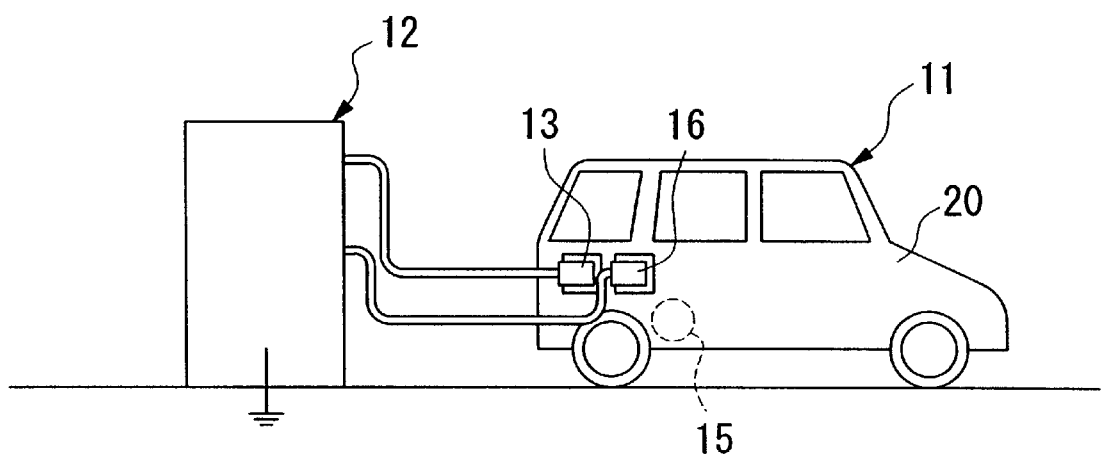
FIG. 5 is a front view showing the fuel cell vehicle to which the fuel gas filler structure is applied and the fuel gas filler station in the second stage of the filling operation of the fuel gas.

Next, when the fuel filler lid opener 36, which is provided in the ground connection concave portion 22, and which is exposed by opening the ground connection lid 30, is manually operated so as to open by the filling operator, the fuel filler lid 26 locked by the fuel filler lid locking mechanism 27 is unlocked by the movement of the unlocking wire 37, and the fuel filler lid 30 is opened as shown in FIGS. 2, 3, and 5. Then, the filling operator removes the cap 23 of the fuel gas filler receptacle 14, which is exposed by opening the fuel filler lid 26, and connects the fuel gas filler nozzle 13 of the external fuel gas filling station 12 to the fuel gas filler receptacle 14 to supply the fuel gas to the vehicle (the connection to the fuel gas filling station 12 is not shown in FIGS. 2 and 3).

After supplying the fuel gas, the filling operator removes the fuel gas filler nozzle 13 from the fuel gas filler receptacle 14, engages the cap 23 with the fuel gas filler receptacle 14, removes the ground line 16 of the fuel gas filling station 12 from the ground connection portion 17, and closes the fuel filler lid 26 and ground connection lid 30. As a result, the state returns to that as shown in FIG. 1, in which the fuel filler lid 26 is locked in the closed state by the fuel filler lid locking mechanism 27, and the ground connection lid 30 is locked in the closed state by the ground connection lid locking mechanism 31.

As explained above, according to the fuel gas filler structure of the present embodiment, when the ground connection lid 30 is closed, and when the ground line 16 of the fuel gas filling station 12 is not connected to the ground connection portion 17, the fuel filler lid 26 cannot be opened because the fuel filler lid opener 36 is covered by the ground connection lid 30 so as not to be exposed. As a result, the connection of the fuel gas filler nozzle 13 of an external fuel gas filling station 12 to the fuel gas filler receptacle 14 is prohibited by the fuel filler lid 26 in a closed state. On the other hand, when the ground connection lid 30 is opened in order to connect the ground line 16 of the fuel gas filling station 12 to the ground connection portion 17, the fuel filler lid opener 36 is exposed so as to be accessible, and the fuel filler lid 26 can be opened. Therefore, the insertion of the fuel gas filler nozzle 13 into the fuel gas filler receptacle 14 can be accomplished only after the ground line 16 is connected to the ground connection portion 17 by merely disposing the fuel filler lid opener 36 for opening the fuel filler lid 26 in a region which is covered by the ground connection lid 30 in a closed state.

Accordingly, a configuration, in which the insertion of the fuel gas filler nozzle 13 into the fuel gas filler receptacle 14 can be accomplished only after the ground line 16 is connected to the ground connection portion 17, can be constructed in a costless manner.

What is claimed is:

1. A fuel gas filler structure for a gas-fueled vehicle comprising:

a fuel gas filler receptacle to which a fuel gas filler nozzle of an external fuel gas filling station is to be connected;

a fuel filler lid which is opened or closed, by a fuel filler lid opener, for selectively covering the fuel gas filler receptacle;

a ground connection portion to which a ground line of the fuel gas filling station is to be connected; and a ground connection lid which is opened or closed for selectively covering the ground connection portion, wherein an operating section of the fuel filler lid opener is disposed in a region which is covered by the ground connection lid in a closed state.

* * * * *